United States Patent [19]

Nicklin et al.

[11] 3,714,328

[45] Jan. 30, 1973

[54] TREATMENT OF GASES AND LIQUIDS

[75] Inventors: Thomas Nicklin, Middleton, Manchester; Fredrick Farrington, Sale, Cheshire, both of England

[73] Assignee: The Gas Council, London, England

[22] Filed: July 22, 1969

[21] Appl. No.: 843,832

[30] Foreign Application Priority Data

May 28, 1969   Great Britain.....................27,059/69
    Sept. 20, 1968  Great Britain.....................44,880/68
    July 25, 1968   Great Britain.....................35,613/68

[52] U.S. Cl.....................................423/244, 208/244
[51] Int. Cl.........................C01h 17/16, C10g 29/00
[58] Field of Search..........23/2, 2 S, 3, 3 L; 208/244, 208/249, 243

[56] References Cited

UNITED STATES PATENTS

| | | | |
|---|---|---|---|
| 1,947,776 | 2/1934 | Huff et al. | 23/2 S |
| 1,819,055 | 8/1931 | Al et al. | 23/3 L |
| 3,116,970 | 1/1964 | Storp et al. | 23/2 S |
| 3,367,862 | 2/1968 | Mason et al. | 208/244 X |

FOREIGN PATENTS OR APPLICATIONS

| | | | |
|---|---|---|---|
| 1,049,918 | 11/1966 | Great Britain | 208/243 |
| 1,154,482 | 6/1969 | Great Britain | 208/243 |
| 1,142,339 | 2/1969 | Great Britain | 208/244 |

*Primary Examiner*—Earl C. Thomas
*Assistant Examiner*—Hoke S. Miller
*Attorney*—Watson, Cole, Grindle & Watson

[57] ABSTRACT

Gases or liquids are steam desulphided in the presence of a catalyst containing a uranium oxide together with a thorium oxide and/or a cobalt oxide. Air may also be present. The process is useful for desulphiding inorganic gases, for example effluent gases and for desulphiding organic compounds such as oils.

6 Claims, No Drawings

TREATMENT OF GASES AND LIQUIDS

The invention relates to the removal of sulphur containing compounds from gases or liquids.

In a number of processes in the gas, chemical and petroleum industries, it is desirable that the sulphur content of liquid or gaseous feedstocks employed in the process should be reduced to a low level. Furthermore, legislation in a number of countries, notably the United States of America, prohibits the discharge of effluent gases into the atmosphere unless the sulphur content of such gases is below a very low maximum concentration.

According to the present invention, there is provided a process for the treatment of gases or liquids to remove therefrom sulphur containing compounds which process comprises contacting a mixture of steam and the gases or liquids to be treated with a catalyst comprising an oxide of uranium together with an oxide of thorium and/or an oxide of cobalt, whereby the sulphur present in said sulphur containing compound is converted into hydrogen sulphide. The hydrogen sulphide produced in the reaction may be collected and removed by methods known in the arts, such as by washing the gases with an aqueous solution of sodium vanadate and the sodium salt of anthraquinone disulphonic acid as described and claimed in British Patent Specification No. 948270. Alternatively the hydrogen sulphide may be removed by contacting the gases with zinc oxide.

The active catalytic components are preferably disposed on the surface of a catalyst carrier, such as $\alpha$-alumina or $\gamma$-alumina. Other carriers which may be employed are silica, kaolin, powdered brick and alkali earth metal oxides such as the oxides of magnesium, calcium, strontium, barium, or mixtures thereof. The carrier may be in the form of spheres.

Where it is required to have a high counter-current flow of liquid and vapor phases, while at the same time maintaining a large solid surface area wetted by the liquid, and efficient mixing of the phases, the catalyst support can be shaped in the form of 'rings', or hollow cylinders, or 'saddles' such as have been found effective in distillation practice. The size of rings used is preferably of the order of 17 mm outside diameter with a hole diameter of 10 mm.

Generally the uranium oxide, which may be in the form of $UO_3$, $U_3O_8$, or other uranium oxides such as $UO_2$, would be present in an amount of from 1 to 80 percent by weight based on the total weight of the catalyst. Preferably the uranium oxide content is from 5 to 20 percent, and in certain cases it may be even more preferred to use a catalyst having a uranium oxide content of from 5 to 10 percent by weight.

If present in the catalyst, thorium oxide, e.g. $ThO_2$ may be in an amount from 3 to 20 percent by weight, more preferably at least 8 or 10 percent by weight and not greater than 15 percent by weight, based on the total weight of the catalyst.

If cobalt oxide is present in the catalyst, it is preferably present in an amount of from 10 to 15 percent by weight based on the total weight of the catalyst.

The catalyst may be prepared by any suitable process, for example by the thermal decomposition of precursors for the metallic oxides forming the active components of the catalyst. Thus the catalyst may be formed by the thermal decomposition of the nitrates, or carboxylates, e.g. acetates, of the active metal components of the catalyst. Other precursors which may be used include thorium and cobalt uranates or diuranates. If the catalyst includes a catalyst carrier, the surface of the carrier may be impregnated with the precursors of the metallic oxides constituting the active components of the catalyst, either from a melt or from a solution. The active metallic oxides can then be formed by heating the metal impregnated carrier either before use, or in situ under the conditions of the desulphiding process.

For example, in one method of forming a catalyst composition of the present invention, a refractory support, e.g. $\alpha$-alumina is dipped in a bath containing a melt of the nitrates of uranium and of thorium and/or of cobalt. The coated support is subsequently calcined at 550°C to decompose the nitrates. The dipping operation may be repeated if necessary.

The process of the invention may be used for removing organic sulphur compounds and/or carbon oxysulphide or carbon disulphide from inorganic gases or gas mixtures, i.e. gases or gas mixtures containing no appreciable amounts of hydrocarbon. In such a process, the active components of the catalyst may consist essentially of uranium oxide and thorium oxide, and the process may be conveniently conducted at an elevated temperature of from 275° to 500°C, or, preferably, from 420° to 480°C. The reaction may be carried out at any desired pressure, such as atmospheric pressure or pressures as high as 25 or even 50 atmospheres. The process may therefore be used to remove sulphur containing compounds from inorganic gas streams which are to be further processed, and in which sulphur compounds are undesirable. In a particular application of the invention carbon oxysulphide is removed from mixtures of carbon dioxide and carbon monoxide. The process of the invention may also be used to purify exhaust gases from various processes, such as those from rubber vulcanizing, artificial fibers production, and tar distillation. The process of the invention may also be used to purify air in atmospheres polluted with the treatable sulphur compounds.

Another use of the process of the present invention is in the removal of sulphur compounds from organic compounds such as oils especially compounds normally in the liquid phase. The process may be conducted with compounds in either the gaseous or the liquid phase. The conditions must be such, however, that the steam does not condense. The ability to use liquid organic compounds is particularly useful in cases where decomposition is likely to take place before the boiling point is reached. In the case of organic feed-stocks, air may be added to the mixture of steam and compounds to be treated. The process is preferably to be conducted at a temperature of from 380° to 460°C. The precise temperature used will depend on the circumstances of the reaction including the nature of the product to be treated, the proportions of steam and sulphur present and the spaced velocity of the reactant through the reaction zone.

There are several ways in which the process of the invention may be conducted. In one embodiment, the compound or compounds to be treated are introduced into a reactor vessel containing a bed of the catalyst, while steam, optionally together with air, is passed through the reactor. The compound or compounds to be treated may be in the vapor phase, i.e. as gas, or in the liquid phase. They may be introduced to the reactor together with the steam or mixture of steam and air, and pass up or down the reactor and through the catalyst bed. Alternatively the compound may be introduced separately from the steam or steam and air mixture, and may pass in counter-current thereto. From one part of the reactor may be extracted the fraction of the organic compound or compounds in the vapor, i.e. gaseous, phase. Any liquid fraction present may be extracted at another part of the reactor.

The hydrogen sulphide and steam and, if present, air will generally be present in the gas taken from the reactor.

If there is a liquid fraction drawn off from the reactor, the liquid will generally be extracted in the form of a foam containing steam and hydrogen sulphide. The fraction will be found to have been desulphided, but probably to a lesser extent than the gas fraction.

It is to be understood that the invention further comprises a gas or liquid, or an organic compound or mixture of compounds whenever purified by the process of the invention.

In order that the invention may be more fully understood the processes of the invention are illustrated by the following examples.

EXAMPLE 1

10 cc of catalyst in the form of ⅛ inch diameter spheres and comprising 9.1 percent Uranium and 11.4 percent Cobalt on α-alumina support was placed in a silica tube and heated to 450°C. A test feedstock comprising a mixture of dioctyl sulphide and desulphided naphtha (1 percent dioctyl sulphide by volume) was passed through the tube at a rate of 22 cc/hour with slightly excess steam.

The product was washed with cadmium acetate solution and subsequently condensed. The amount of cadmium sulphide was determined iodometrically and the percentage conversion to hydrogen sulphide calculated. The conversion was found to be 77 percent.

EXAMPLE 2

10cc of catalyst comprising 13.3 percent Uranium and 14.6 Thorium on ⅛ inch diameter alpha alumina spheres was placed in the silica tube and heated to 450°C.

A feed stock similar to that used in Example 1 was passed through the tube and the resultant product washed with cadmium acetate before condensation. The amount of cadmium sulphate present was determined and the percentage conversion to hydrogen sulphide calculated as before.

The conversion was found to be 100 percent.

EXAMPLE 3

10 milliliters of catalyst in the form of ⅛ inch diameter spheres and comprising 11.7 percent Uranium and 9.1 percent Thoria on alpha alumina support was placed in a silica tube and heated to 450°C. A test feedstock comprising a mixture of 0.7 percent dioctyl sulphide and 0.7 percent thionaphalene in primary flash distillate was passed through the tube at a rate of 20 milliliters/hour together with a mixed stream of air and steam at a temperature of 380°C. The water/steam flow rate was 20 milliliters/hour and the air flow rate was 0.1 cubic feet/hour.

The product was washed with cadmium acetate solution and subsequently condensed. The amount of cadmium sulphide was determined iodometrically and the percentage conversion to hydrogen sulphide calculated. The conversion was found to be 98 — 99 percent.

EXAMPLE 4

This example is concerned with the removal of COS from a gas consisting essentially of 60 percent by volume $CO_2$ and 40 percent by volume CO. The COS content of this feed gas was 300 grains/100 ft$^3$. The $CO_2$/CO mixture containing the COS was admixed with about three times the minimum amount of steam which was required to convert the sulphur in the COS to $H_2S$. The gas to be treated under steam was then passed through an externally heated tube containing the catalyst. The catalyst was supported on corundum and contained 8.9 percent by weight of uranium oxide and 10.5 percent by weight of thorium oxide. After the gas to be treated had been passed through the catalyst, it was cooled and treated with an absorber for $H_2S$.

In order to determine the amount of COS in the treated gas, it was admixed with hydrogen and passed over a Nimox catalyst at 400°C. The $H_2S$ thus produced was measured by Dräger tubes.

The experiment described above was carried out at atmospheric pressure.

The results obtained from carrying out the above procedure are as follows:

TABLE

| Test No. | Space velocity hour$^{-1}$ | Catalyst Temp. °C | COS inlet gr/100 ft$^3$ | $H_2S$ outlet p.p.m. |
|---|---|---|---|---|
| 1 | 515 | 355 | 300 | <1 |
| 2 | 412 | 360 | 300 | <1 |
| 3 | 411 | 370 | 690 | 6 |
| 4 | 750 | 370 | 300 | 8–9 |

We claim:

1. In a process for purifying a hydrocarbon stream which contains sulfur contamination comprising one or more of organic sulfur compounds, carbon oxysulfide and carbon disulfide, the steps of:

admixing steam with said sulfur contaminated hydrocarbon stream to produce an admixture thereof;

contacting said admixture at a temperature of from 275° to 500°C with a catalyst consisting essentially of, as active ingredients, from 5 to 20 percent by weight of an oxide of uranium, from 10 to 20 percent by weight of an oxide of thorium and from 10 to 15 percent by weight of an oxide cobalt, all weight percentages being based on the total weight of the catalyst, whereby to convert the sulfur in said sulfur contamination into hydrogen sulfide; and thereafter removing said hydrogen sulfide from said admixture.

2. A process as set forth in claim 1 wherein said oxide of uranium is uranoso-uranic oxide.

3. A process as set forth in claim 1 wherein said oxide of uranium is uranium trioxide.

4. A process as set forth in claim 1 wherein the metallic oxides constituting the active components of the catalyst are disposed on the surface of a catalyst carrier.

5. A process as set forth in claim 1 wherein air is added to said mixture.

6. A process as set forth in claim 1 wherein said hydrocarbon stream is maintained in gaseous form during said contacting step.

* * * * *